United States Patent [19]

Mueller et al.

[11] Patent Number: 4,634,401
[45] Date of Patent: Jan. 6, 1987

[54] JOURNAL CROSS WITH HIGH FATIGUE STRENGTH

[75] Inventors: Helmut Mueller, Heidenheim; Reinhard Bretzger, Gerstetten-Dettingen, both of Fed. Rep. of Germany

[73] Assignee: Voith Transmit GmbH, Fed. Rep. of Germany

[21] Appl. No.: 250,655

[22] Filed: Apr. 3, 1981

[30] Foreign Application Priority Data

Apr. 5, 1980 [DE] Fed. Rep. of Germany ....... 3013443
Mar. 21, 1981 [DE] Fed. Rep. of Germany ....... 3111145

[51] Int. Cl.$^4$ .............................................. F16D 3/40
[52] U.S. Cl. ..................................................... 464/136
[58] Field of Search ................... 464/11, 14, 121, 112, 464/905, 136

[56] References Cited

U.S. PATENT DOCUMENTS

| | | | |
|---|---|---|---|
| 2,051,248 | 8/1936 | Dunn | 464/905 X |
| 2,209,855 | 7/1940 | Slaght | 464/14 X |
| 3,119,246 | 1/1964 | Koch et al. | 464/14 |
| 3,353,374 | 11/1967 | Buthenhoff | 464/14 |
| 4,103,512 | 8/1978 | McElwain et al. | 464/14 |
| 4,300,361 | 11/1981 | Lindenthal et al. | 464/113 |

FOREIGN PATENT DOCUMENTS 1575839 2/1970 Fed. Rep. of Germany.
2556769 12/1976 Fed. Rep. of Germany.

OTHER PUBLICATIONS

"Konstruktion", 1964, vol. 10, pp. 400-407.

*Primary Examiner*—Stuart S. Levy
*Assistant Examiner*—Daniel P. Stodola
*Attorney, Agent, or Firm*—Ostrolenk, Faber, Gerb & Soffen

[57] ABSTRACT

A spider for a Hooke's joint typically includes a center piece and four pins radiating therefrom. The pins are all located in a plane which intersects the rotation axis of the spider. Between adjacent pins, the center piece has a transition section, which is machined to define a concave fillet. In the preferred form, the fillet is shaped to define an arched, toric outer surface, and particularly as viewed along a longitudinal cross section along the rotation axis of the center piece, the outer surface comprises two partially cylindrical fillets symmetrically located at opposite sides of the plane through which the axes of the pin pass. These two fillets are machined by a tool that moves longitudinally along a path parallel to the plane of the pin axes for machining and the tool is swung around a swivel axis parallel to the plane of the pin axis for forming the fillets symmetrically of the plane of the pin axis.

3 Claims, 4 Drawing Figures

JOURNAL CROSS WITH HIGH FATIGUE STRENGTH

The present invention relates to a journal cross or a spider for a Hooke's joint of the type known for instance from West German Provisional Pat. No. 28 25 556.

The known spider consists of a center piece and four pins which radiate from the center piece and as a rule lie in a single plane and in each case in pairs of intersecting axes. Such a spider is customarily made of forged steel and is thereupon machined essentially only at the ends of the pins in order to receive the anti-friction or plain bearings. The known spider, in addition, has a central borehole which is perpendicular to the plane of intersection of the axes of the pins.

The introduction of the power to the spider takes place from one of the two forks forming the joint, which fork transmits the moment of rotation in the form of circumferential force to two pins. The further transmission of the moment of rotation takes place via the other two pins to the second fork. In this way the pins themselves are stressed substantially in flexure in their circular cross section. Due to the fact that the moment of rotation is not introduced from the hub-like center piece—as in the case of a wheel—but is taken up and transmitted by the pins, the direction of stressing on the pins is pair-wise in clockwise direction and pair-wise counterclockwise direction. Each pin, therefore, has an adjacent pin which, upon the introduction of a moment of rotation, is deformed away from the latter. The greatest local stressing of material takes place in this connection in the transition region from the pin to the center piece of the spider. This stressing is even greater when the center piece has a central axial borehole.

The known embodiment of such a spider has the disadvantage that the stress at this place may be so great that the ability of the spider to transmit the moment of rotation is less than that of the other structural parts of the joint which participate in the transmission of the moment of rotation.

The object of the present invention is so to develop a spider which is provided, in particular, with a central borehole that, for given principal dimensions, the stressing of the material is less than heretofore.

This object is achieved in accordance with the invention. The outer contour of the center piece at the transition between two adjacent pins is formed concavely rounded, in the form of a fillet, as seen in the direction of the axis of rotation. The inventor has recognized that the development of the transition from the circular section of the pin to the solid center of the spider and further to the adjacent pin is of particular importance.

In particular when a borehole is present, the tensile stress in the transition zone is considerably increased. A central axial borehole through the spider is necessary, for instance, for the passage of an actuating member for the stopping of swing.

However, the parting plane of the die-cast part extends right in the gusset between two pins. The required inclination of the surface terminates in a narrow burr of small cross section. Through this burr there extend the stress lines, which are compressed very strongly from the pin towards the small cross section. The zone of highest tensile stress thus lies in the region of smallest cross section. This leads to increased danger of local over-stressing with plastic deformation and the formation of cracks.

In accordance with the invention the spider is provided at the said transition between two pins with a fillet which extends in axial direction. This fillet lies closer to the center of the spider and cuts off a given region of the solid center piece. Material is therefore intentionally removed. In this way the region of transition between two pins is widened. Under load there is obtained a desired deflection of the stress lines into a wider region. The advantage lies in the fact that essentially not only does the edge region of the pin which faces the adjacent pin enter into action but also zones lying deeper in the cross section of the pin participate in the tensile and flexural stressing. With a greater distance from the outside diameter of the pin more cross section is available so that a supporting effect and, as a whole, increased flexural strength result. The stress lines are displaced into deeper-laying zones of the pin and of the center piece.

In this way it has been possible considerably to increase the ability to withstand moments of rotation and, in the case of a spider with a central borehole, fully to compensate for the loss of strength, so that a spider developed in this manner has the same ability to withstand moments of rotation as a spider without a borehole does.

Another concept of the invention consists of developing the fillet between two pins not only in the manner of a single cylindrical wall surface but as a continuously arched toric outer surface. This surface can also be developed as a concavity composed of several surfaces. For manufacture there is particularly advantageous a machining of the fillet which has, symmetrical to the plane which is formed by the axes of the pins, a toricly curved outer surface adjoining which on both sides at a given angle to the longitudinal axis of the spider there are cylindrical surfaces which are also symmetric to the said plane of symmetry. The transition from the unmachined center to the pin is thereby made even more fluid and the introduction of the power accordingly continuous and without notch.

One embodiment of the invention is shown in the accompanying drawing in which.

Figure 1:
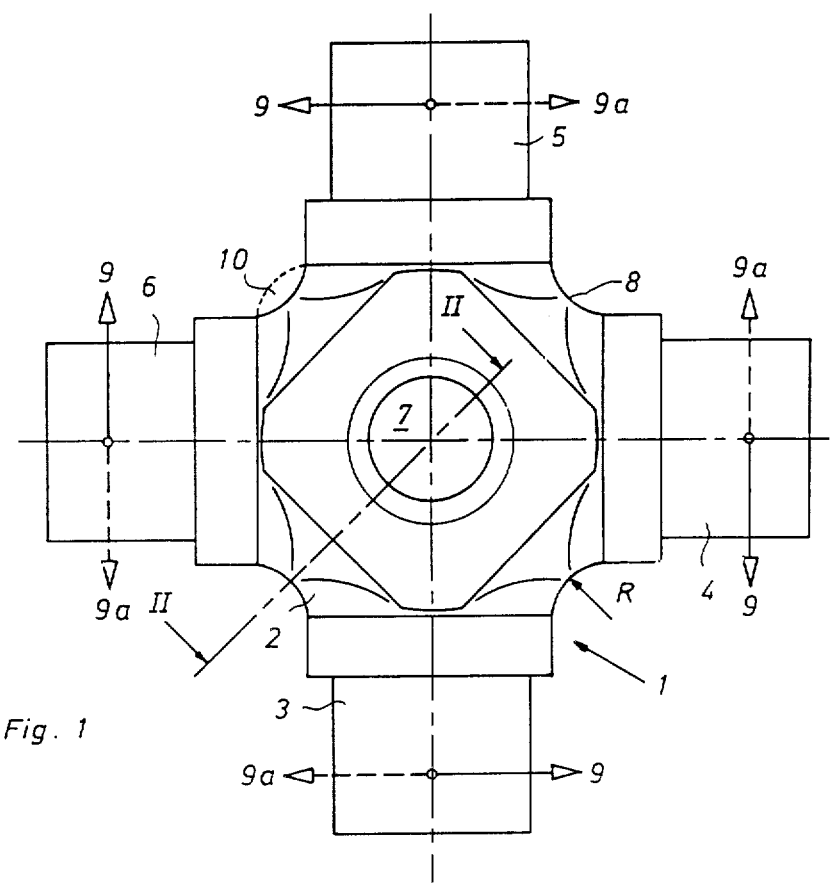
FIG. 1 is a view of a spider as seen in the direction of the axis of rotation.
Figure 2:
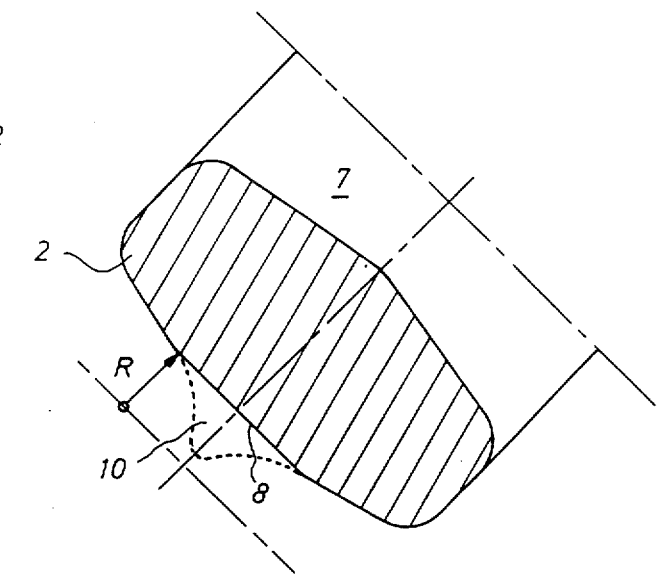
FIG. 2 is a partial section along the line II—II of FIG. 1.
Figure 3:
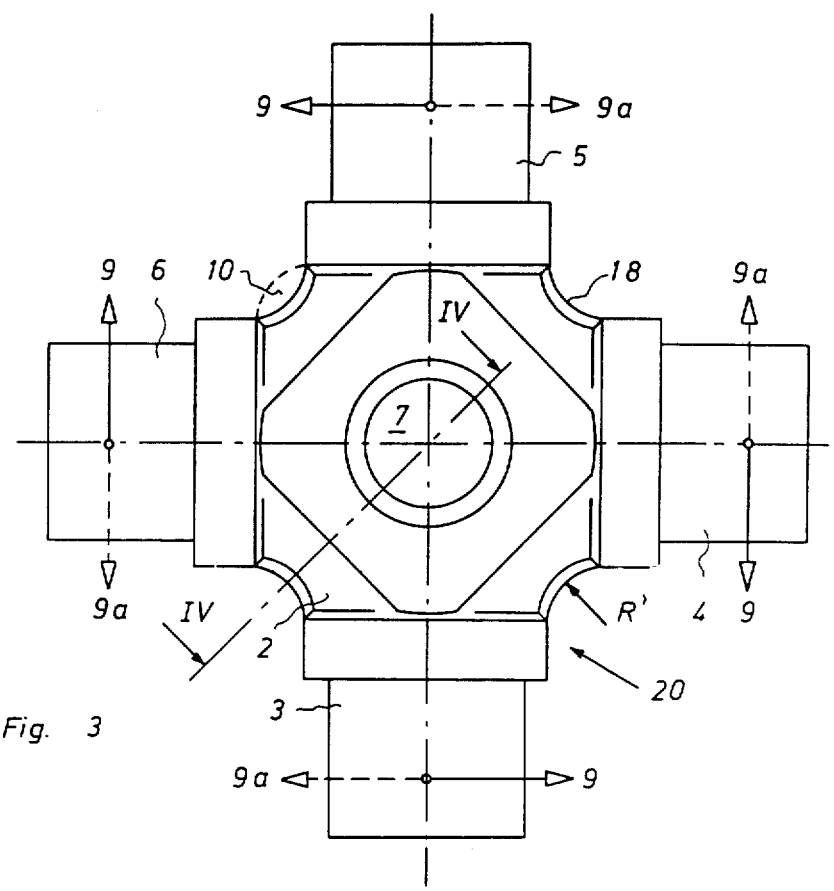
FIG. 3 is a view of the spider with more extensive machining, seen in the direction of the axis of rotation.
Figure 4:
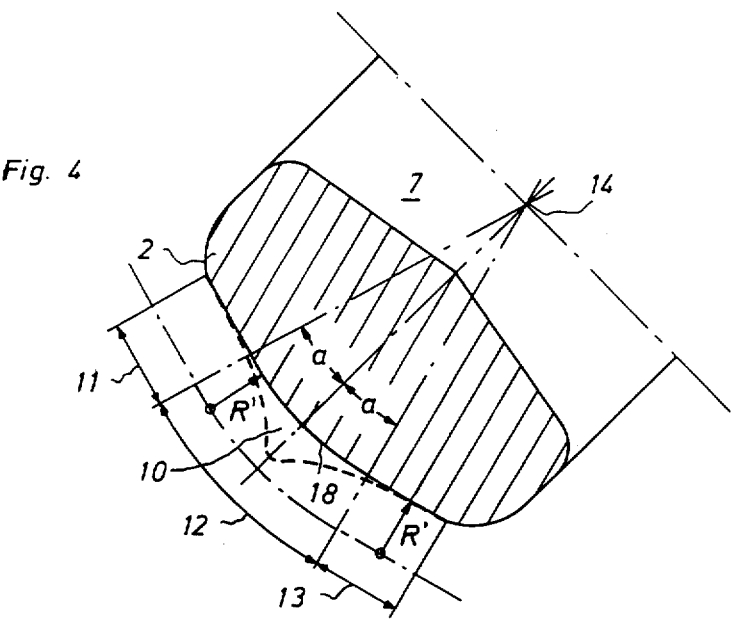
FIG. 4 is a partial section along the line IV—IV of FIG. 3.

FIGS. 3 and 4 bear the same reference numbers as FIGS. 1 and 2 insofar as the individual parts in question correspond.

FIG. 1 shows the spider 1 having the center piece 2 and the four pins 3, 4, 5 and 6, as well as a central borehole 7. The invention is also applicable to a spider without borehole. The particularly deeply cut fillet 8 between the pins can be noted. The fillet is a concavely rounded cutout, as viewed along the direction of rotation. The arrows 9 show a possible direction of loading in the pins, from which it is clear that particularly high continuous alternating stresses occur, for instance, in the fillets 8 between the pins 4 and 5 as well as between the pins 3 and 6. Upon the application of load in the direction indicated by the arrows 9a the highest stresses occur between the pins 3 and 4 and the pins 5 and 6.

FIG. 2 shows a section through the center piece 1 in the region of the fillet 8. 10 indicates the contour which the transition region between two pins would have without the measure in accordance with the invention. Within this cross section enclosed by the contour line 10 lies the zone which is most highly stressed. By the, for instance, cylindrical fillet of radius R zones of larger cross section in the center piece 2 participate in the tensile stressing.

The cylindrical fillet of radius R has a radius of curvature, as viewed along the axis of rotation, that forms an at least approximate tangent to the longest machined diameter of two of the pins 3, 4, 5 or 6 that are adjacent that fillet.

FIG. 3 shows a view of the spider 20 in the embodiment with increased machining in the region of the fillets 18, seen in the direction of the axis of rotation. Differing from FIG. 1 it can be noted that the rounding of the fillets 18 of radius R' extends into the region of the gusset between two adjacent pins which is visible on the end of the spider.

FIG. 4 shows the machining of the fillet 18 whose center part in the region 12 is a toric surface with the center 14 which at the same time may also be the center of the entire spider 20. Adjoining it tangentially on both sides are cylindrical surfaces in the regions 11 and 13 which extend symmetrically to the plane of the centers of the pins. Each such cylindrical surface is defined around a center which is inclined about 15° from the plane of the pin axes. The cylindrical surfaces are produced in each case by preferably machining by means of a tool, for instance a miller, whose cutting edges have the radius R'. The spider is so brought to the tool—or vice versa—that first of all, as a result of the removal of material, the cylindrical surface is produced, for instance, in the region 11. Thereupon the tool or the spider, with simultaneous further machining, is swung around the center 14 so that upon turning through the angle 2a the toric surface in the region 12 is formed. Upon linear further guidance of the tool into the region 13 there is then obtained the symmetrically arranged second cylindrical surface.

By free uninterrupted machining there result continuous transitions, i.e. transitions which are free of shoulders and kinks between the surfaces of the regions 11 and 12 as well as 12 and 13, whereby the desired continuous distribution of the tensile stresses over a wide cross section is obtained

We claim:

1. A spider for a Hooke's joint, comprising:
   a center piece having a rotation axis; four pins radiating from the center piece; each pin having a respective axis, and the pin axes lying all essentially in a plane, and that plane intersecting the rotation axis; the center piece having transition regions between adjacent pins, and at each of the transition regions, the center piece being thick enough along the rotation axis that each transition region has a concave, rounded fillet surface defined in it, the fillet surface is long enough to be generally cylindrically curved around and the fillet surface extends along a respective fillet surface axis, which fillet surface axis is generally parallel to the rotation axis of the center piece, the fillet surface being an arcuate portion of a cylinder, and the generally cylindrically curved fillet surface has a generally constant radius measured from the fillet surface axis along the axial length of the fillet surface.

2. A spider according to claim 1, wherein the cylindrically curved fillet surface has a radius of curvature, as viewed along the axis of rotation and as measured from the center of curvature of the fillet, that forms an at least approximate tangent to the diameter of the pins adjacent the fillet.

3. A spider according to claim 1, wherein the spider has a borehole which extends along the axis of rotation.

* * * * *